(12) United States Patent
Siegel

(10) Patent No.: US 9,290,196 B1
(45) Date of Patent: Mar. 22, 2016

(54) SHOPPING CART BRAKE

(71) Applicant: Ellen Kusovitsky Siegel, Southport, CT (US)

(72) Inventor: Ellen Kusovitsky Siegel, Southport, CT (US)

( * ) Notice: Subject to any disclaimer, the term of this patent is extended or adjusted under 35 U.S.C. 154(b) by 0 days.

(21) Appl. No.: 14/300,535

(22) Filed: Jun. 10, 2014

(51) Int. Cl.
*B62B 5/04* (2006.01)

(52) U.S. Cl.
CPC ...................... *B62B 5/049* (2013.01)

(58) Field of Classification Search
CPC ...... B62B 5/04; B62B 5/0433; B62B 5/0485; B62B 5/049
See application file for complete search history.

(56) References Cited

U.S. PATENT DOCUMENTS

| | | | |
|---|---|---|---|
| 607,779 A | 7/1898 | Burkhart | |
| 2,020,904 A | 11/1935 | Pawsat | |
| 3,044,577 A | 7/1962 | Lotz | |
| 3,217,839 A * | 11/1965 | Watkins et al. | 188/4 R |
| 3,652,105 A * | 3/1972 | Humlong | B62H 1/02 280/301 |
| 3,712,640 A * | 1/1973 | Shipman | B62H 1/02 280/301 |
| 3,763,966 A | 10/1973 | Close | |
| 4,844,209 A | 7/1989 | Sedlack | |
| 5,035,445 A * | 7/1991 | Poulin | 280/763.1 |
| 5,511,802 A * | 4/1996 | Aitken | 280/1.5 |
| 5,630,600 A * | 5/1997 | Pasillas | 280/33.994 |
| 6,834,869 B1 * | 12/2004 | Adams | 280/33.994 |
| 7,014,203 B2 | 3/2006 | Liu | |
| 2002/0140189 A1 * | 10/2002 | McIntyre | 280/33.994 |
| 2005/0082775 A1 | 4/2005 | Slager | |
| 2010/0283222 A1 * | 11/2010 | Lin | 280/303 |

FOREIGN PATENT DOCUMENTS

| | | |
|---|---|---|
| CA | 730591 | 3/1996 |
| DE | 999781 | 1/1939 |
| GB | 2256685 | 12/1992 |
| JP | 2006001328 | 1/2006 |

* cited by examiner

*Primary Examiner* — Vishal Sahni
(74) *Attorney, Agent, or Firm* — Michael I. Kroll

(57) ABSTRACT

A method of immobilizing a shopping cart has the steps: a) providing a shopping cart braking system mountable to a forward frame member of a shopping cart, the braking system having a bracket, an axle within the bracket, an arm pivotally affixed to the axle and having a distal end pivotable about the axle between a horizontal position and a vertical braking position, with a resilient brakepad affixed to the distal end of the arm; b) mounting the braking system to a forward frame member of a shopping cart; and c) pivoting the arm from the horizontal to the braking position with the resilient brakepad acting as a brake preventing movement of the shopping cart.

12 Claims, 12 Drawing Sheets

SHOPPING CART BRAKE

BACKGROUND OF THE INVENTION

1. Field of the Invention

Figure 1:
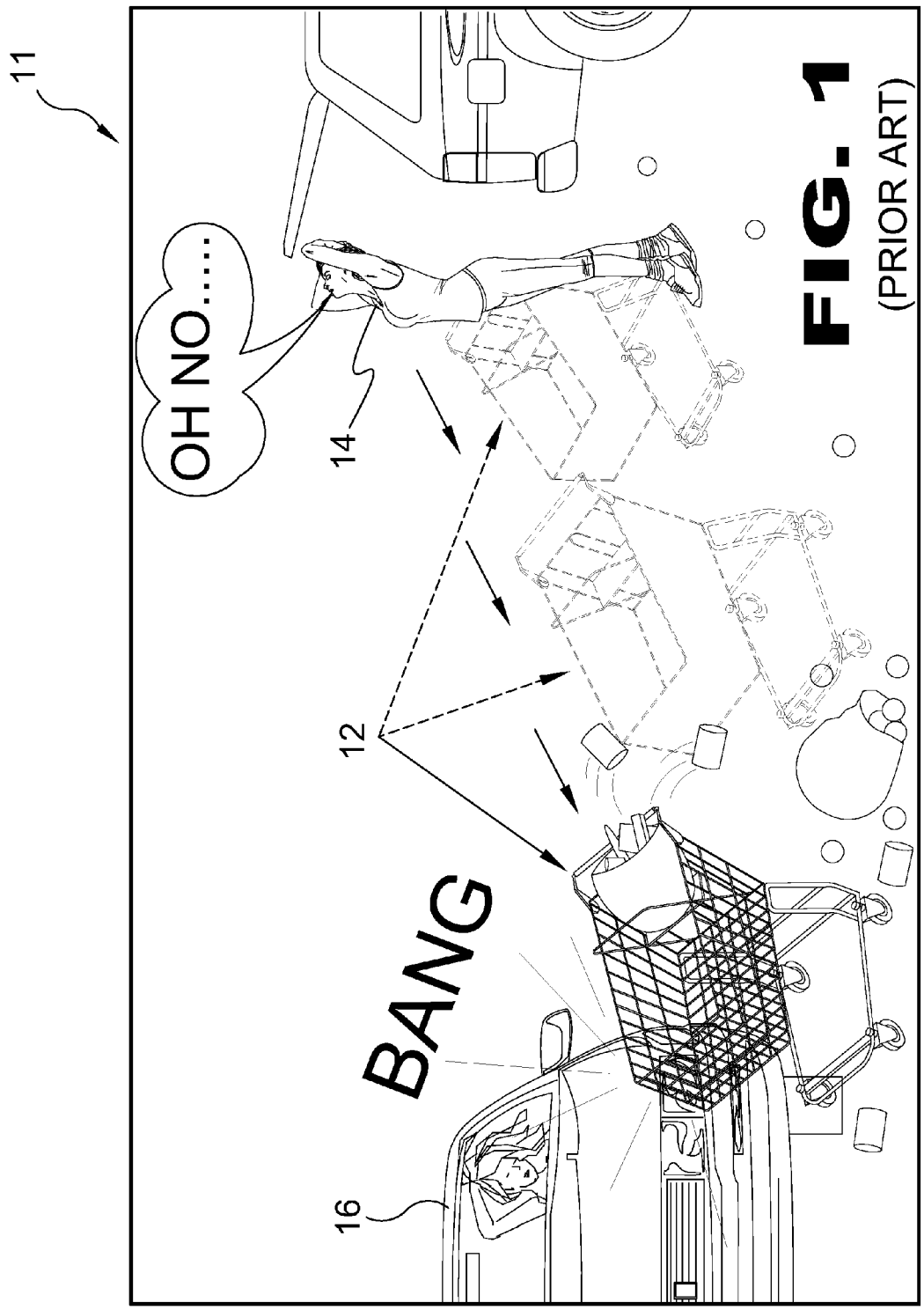

The present invention relates generally to brake systems and, more specifically, to a brake for a shopping cart comprising a clamp mountable to the forward frame of a shopping cart having an angularly extendible arm terminating in a base so that when extended the base forms a brake to prevent the shopping cart from rolling. The brake is affixed to the forward bottom portion of the frame with the brake base moveable, such as by the flick of a foot, from a disengaged position to a ground engaging position and where tangential force upon the shopping cart frame releases the ground engaging position. The brake base has an elastomeric or polymeric footing serving as the frictional element for the shopping cart brake.

2. Description of the Prior Art

There are other shopping cart brake devices designed for similar purposes. Typical of these is U.S. Pat. No. 3,044,577 issued to Lotz on Jul. 17, 1962.

Another patent was issued to Watkins on Nov. 16, 1965 as U.S. Pat. No. 3,217,839. Yet another U.S. Pat. No. 3,763,966 was issued to Close on Oct. 9, 1973 and still yet another was issued on Jul. 4, 1989 to Sedlack as U.S. Pat. No. 4,844,209.

Another patent was issued to Pasillas on May 20, 1997 as U.S. Pat. No. 5,630,600. Yet another U.S. Pat. No. 6,834,869 was issued to Adams on Dec. 28, 2004. Another was issued to Liu on Mar. 21, 2006 as U.S. Pat. No. 7,014,203 and still yet another was issued on Jan. 14, 1939 to Palm as Germany Patent No. DE669781.

Another patent was issued to Kalpin on Mar. 22, 1966 as Canada Patent No. CA730591. Yet another UK Patent No. GB 2,256,685 was issued to Kao on Dec. 16, 1992. Another was issued to Takahashi on Jan. 5, 2006 as Japan Patent No. JP2006001328.

U.S. Pat. No. 3,044,577

Inventor: Martin Lotz

Issued: Jul. 17, 1962

A shopping cart having a generally horizontal support member proximate the cart wheel, a brake stand comprising a rocker arm pivotally mounted to said support member for rotation in a vertical plane, said arm defining first and second elongate sections with the pivot point of said rocker arm being in first section and with said second section extending longitudinally away from one end of said first elongate section, the length of said second section being greater than the perpendicular distance from a plane tangent to the lowermost surface of said cart wheels to the lower surface of said support member adjacent said pivot point.

U.S. Pat. No. 3,217,839

Inventor: Norman Watkins et al.

Issued: Nov. 16, 1965

A brake system for a wheel supported in a substantially vertical plane for rotation about a horizontal axle.

U.S. Pat. No. 3,763,966

Inventor: James Close

Issued: Oct. 9, 1973

A manually operable ground engaging brake for use on wheeled vehicles such as merchandise carts, baby carriages, wheel chairs, or the like, which can be selectively engaged by the operator to park or anchor the cart as desired to hold the cart in place on an inclined surface or in a strong wind or the like.

U.S. Pat. No. 4,844,209

Inventor: Mark Sedlack

Issued: Jul. 4, 1989

A safety brake for a child's walker is constructed of a braking bar pivotally mounted to the base of the walker for rotation between a nonbraking position above the wheels and a braking position whereby a straight section of the bar extends below the wheels to lift the wheels out of contact with the floor. A releasable catch on the walker base retains the braking bar in the nonbraking position, and a spring urges the bar into the braking position upon release thereof from the catch.

U.S. Pat. No. 5,630,600

Inventor: Norbert Pasillas

Issued: May 20, 1997

A restraining device for preventing undesirable motion of a manually propelled cart, or a shopping cart brake, in accordance with the present invention generally includes a frame, a brake foot mounted thereto, and a counterweight for balancing the brake foot in a disengaged position. The device is preferably mounted to a front crossbar of a conventional shopping cart, and upon a manual jerking motion of the cart, the brake foot swings into engagement with a ground surface thus lifting the front wheels off the ground and immobilizing the cart. No levers or complex mechanics are required to engage the brake. The device may also include a hinged door for insertion of product promotions or advertisements on a highly visible portion of the device frame.

U.S. Pat. No. 6,834,869

Inventor: Mary Adams

Issued: Dec. 28, 2004

A shopping cart braking device, for use in conjunction with an existing shopping cart, for selectively immobilizing the shopping cart upon a support surface. The braking device comprises a substantially U-shaped tube having a first end, a second end, and a horizontal centrally located connecting portion extending concentrically through a brake pad. The first and second ends of the braking device are hingeably attached to the front crossbar of the shopping cart, in proximity to the front wheels of the shopping cart. When the braking device is in the unbraked position, the braking device has been raised by a foot of the user, and the movement of the shopping cart is unimpeded. When the braking device is in the braked position, the braking device has been lowered by the foot of the user, the brake pad is wedged under the front wheels of the shopping cart, and the shopping cart is immobilized.

U.S. Pat. No. 7,014,203

Inventor: Dong Shuei Liu

Issued: Mar. 21, 2006

A kick stand assembly for a baby stroller includes a first link and a second link respectively connected to a rear post of the baby stroller and a kick stand has one end pivotably connected to the first link and the second link is pivotably connected to a mediate portion of the kick stand. When the stroller is folded, the kick stand is stretched outward by pivoting the first and second links, and the other end of the kick stand contacts the ground. The folded stroller is then supported on the kick stand.

German Patent Number DE669781

Inventor: Emanuel Larsson Palm

Issued: Jan. 14, 1939

A stand as shown in the drawing figures.

Canada Patent Number CA730591

Inventor: Max Kalpin

Issued: Mar. 22, 1966

Means for immobilizing a vehicle, and particularly discouraging attempts to propel supermarket shopping carts beyond circumscribing barrier or property of supermarket.

UK Patent Number GB 2,256,685

Inventor: Ming Hsien Kao

Issued: Dec. 16, 1992

A braking mechanism in a wheeled structure which is collapsible along an axis and is provided with at least two spaced wheels, each having a brake and being mounted on that axis, incorporates a brake operating member which is movable between two stable positions in which the brakes are applied and are released respectively, and the operating member comprises an extendible bar having at least two members slidable relative to one another by means of cooperating surfaces along said axis operatively to connect the bar to the brakes in all states of collapse of the structure. Where the wheels have limited swiveling action, the bar is appropriately connected to each brake.

Japan Patent Number JP20060011328

Inventor: Haruhito Takahashi

Issued: Jan. 5, 2006

To provide a vehicle in which a stopper abutted on a bottom side of a supporting part of a main stand formed on a bottom side of a unit swing type engine is arranged on an upper end of the main stand at the position opposite to the spring arrangement position, reducing of the holding moment when using the main stand caused by a wear of a pivotably-supporting part on the spring arrangement side is prevented, and the stopped vehicle when using the main stand is stabilized.

Solution

In a scooter, a stopper is formed at the position opposite to the arrangement position of a coil spring so as to be abutted on the left half of a supporting part, and a point-contact position with respect to the supporting part formed on the bottom side of the unit swing type engine forms a center of the bottom side of the supporting part according to the forming position. As a result, the distance L to the coil spring at the point-contact position of the stopper is less different from the distance L from the coil spring in case of the line contact in a regular state, and the holding power to stop the turn of the main stand is increased.

While these brake systems may be suitable for the purposes for which they were designed, they would not be as suitable for the purposes of the present invention, as hereinafter described. The present invention provides a brake for a shopping cart comprising a clamp mountable to the forward frame of a shopping cart having an angularly extendible arm terminating in a base so that when extended the base forms a brake to prevent the shopping cart from rolling. The brake is affixed to the forward bottom frame with the brake base moveable through foot pressure from a disengaged position to a ground engaging position and where tangential force upon the shopping cart frame releases the ground engaging position. The brake base has an elastomeric or polymeric footing serving as a frictional element for the shopping cart brake.

SUMMARY OF THE PRESENT INVENTION

A primary object of the present invention is to provide a brake for a shopping cart comprising a clamp mountable to the forward frame of a shopping cart.

Another object of the present invention is to provide a clamp mountable to the forward frame of a shopping cart having an angularly extendible arm terminating in a base so that when extended the base forms a brake to prevent the shopping cart from rolling.

Yet another object of the present invention is to provide a brake for a shopping cart where the brake is affixed to the forward bottom frame with the brake base moveable through foot pressure from a disengaged position to a ground engaging position and where tangential force upon the shopping cart frame releases the ground engaging position.

Still yet another object of the present invention is to provide a brake base having an elastomeric or polymeric footing serving as a frictional element for the shopping cart break.

Additional objects of the present invention will appear as the description proceeds.

The present invention overcomes the shortcomings of the prior art by providing a braking system for a shopping cart comprising a clamp mountable to the forward frame member of a shopping cart and a pivotally affixed arm having a distal end which, when pivoted downward to a vertical position, acts as a brake to prevent the shopping cart from rolling. The brake is affixed to the forward bottom frame member of the shopping cart with the arm moveable, for example, through pressing with a foot, from a disengaged, horizontal (up) position to a ground engaging, vertical position and where a tangential, or sideways, force upon the front of the shopping cart frame releases the brake. The distal end of the arm has an elastomeric or polymeric brakepad affixed thereto serving as a frictional element for the shopping cart braking system of the invention.

The foregoing and other objects and advantages will appear from the description to follow. In the description reference is made to the accompanying drawing figures, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Figure 2:
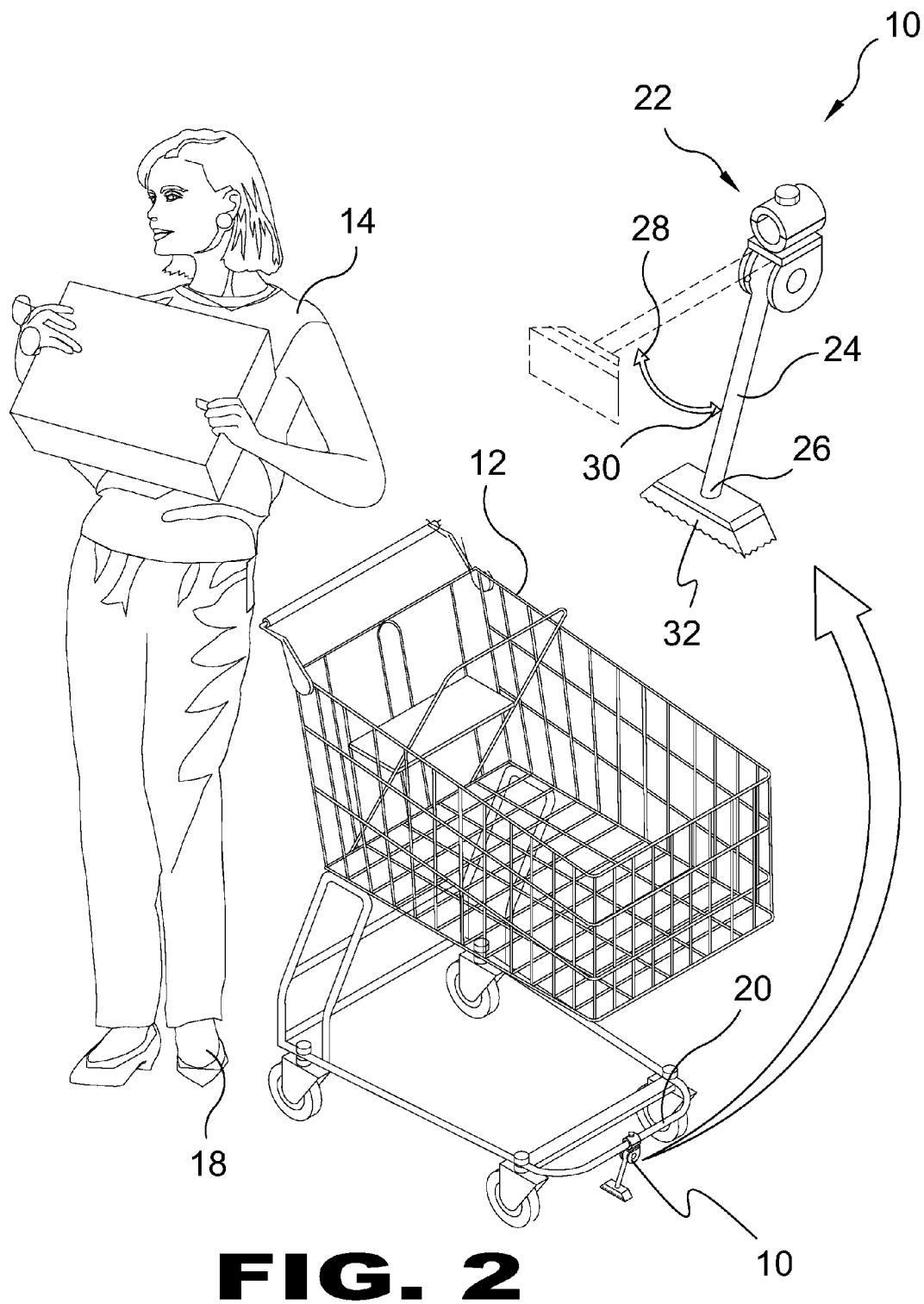
Figure 3:
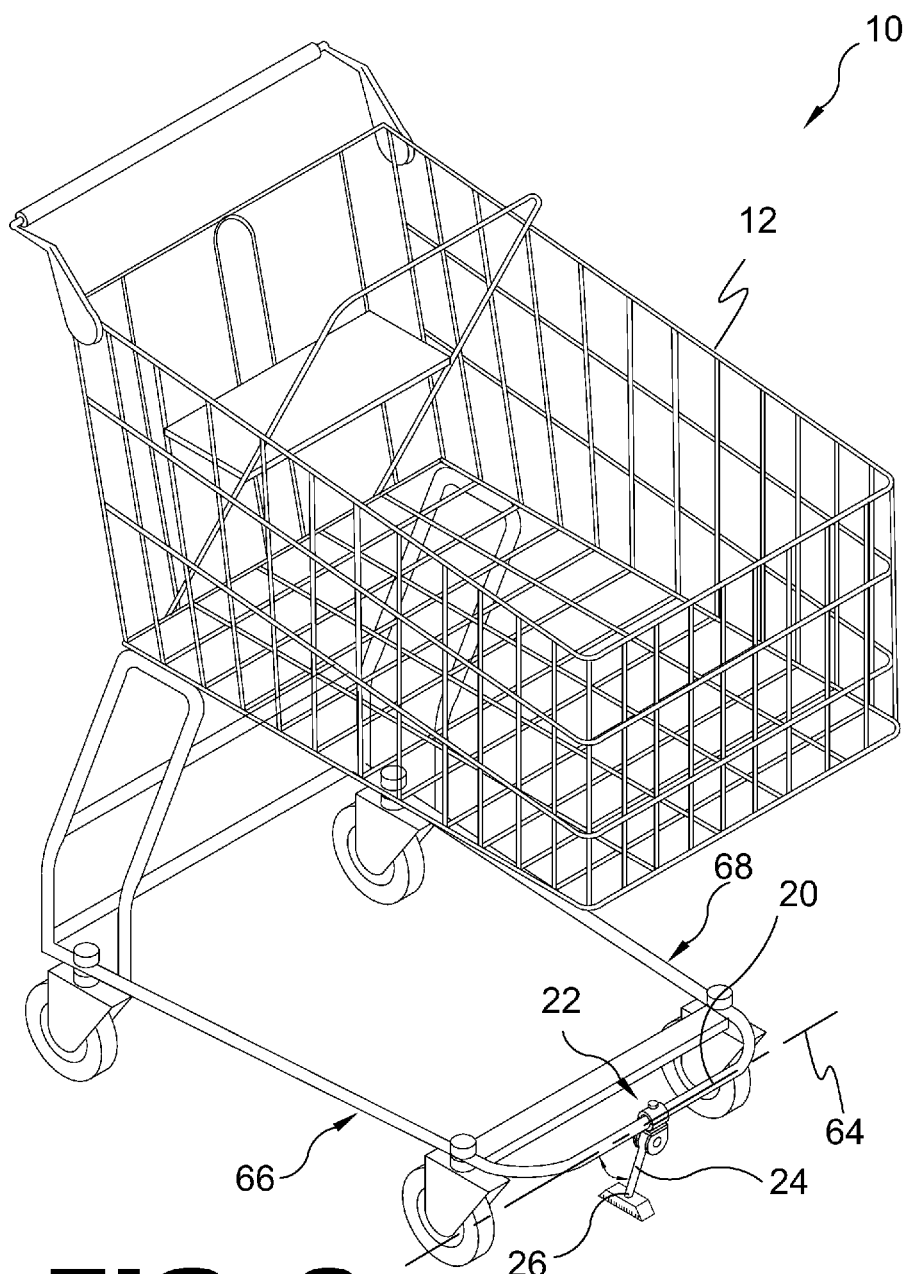
Figure 4:
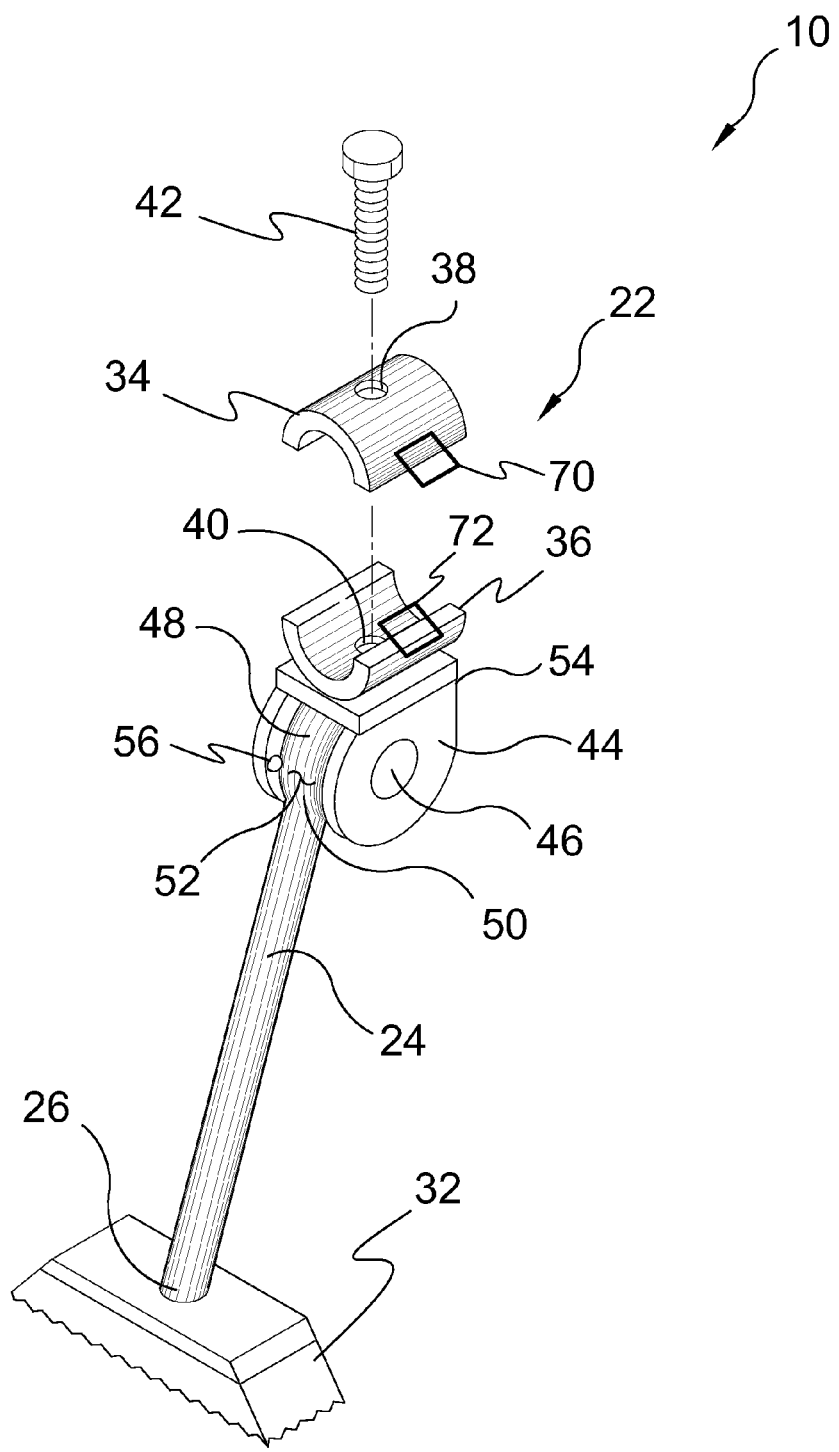
Figure 5:
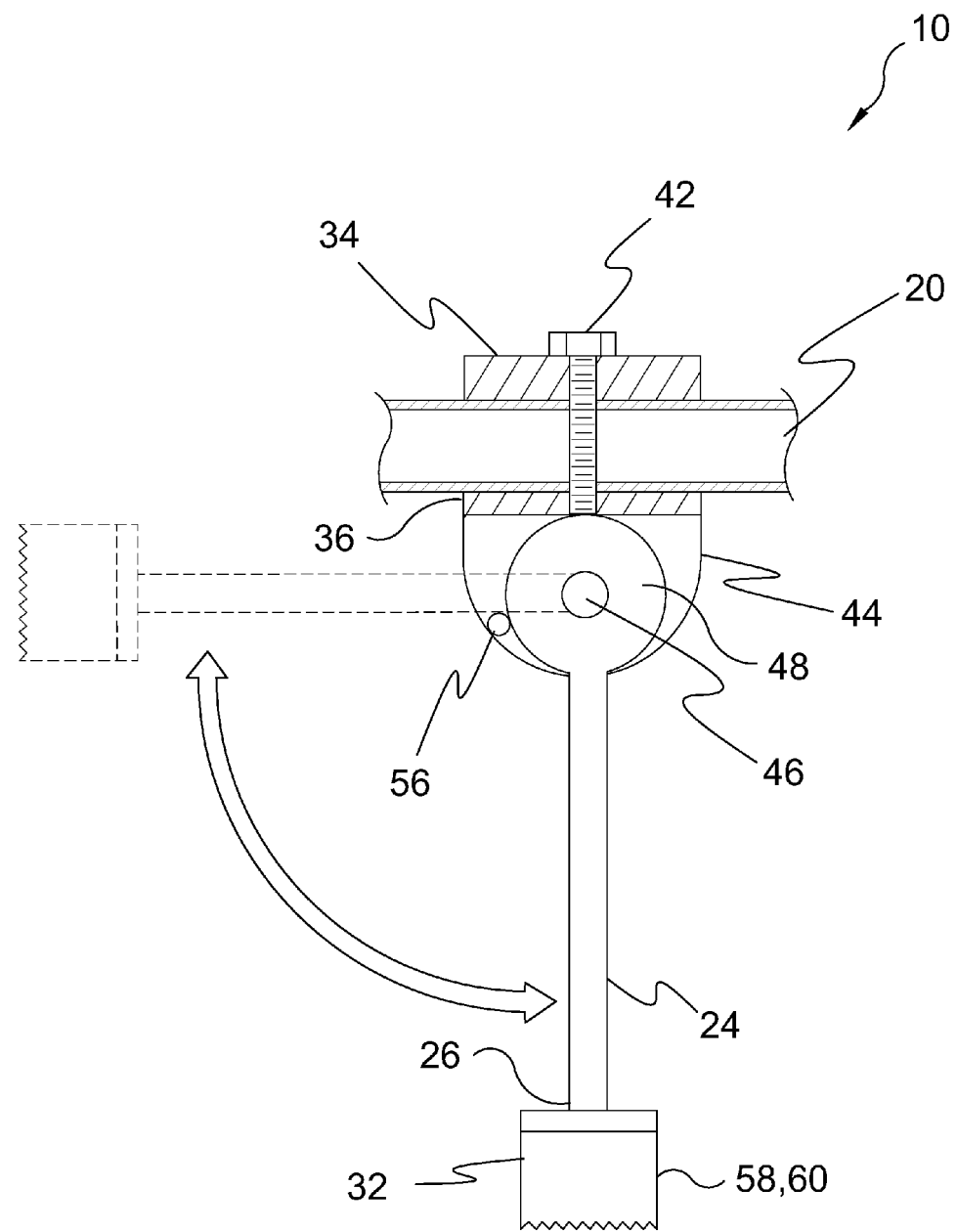
Figure 6:
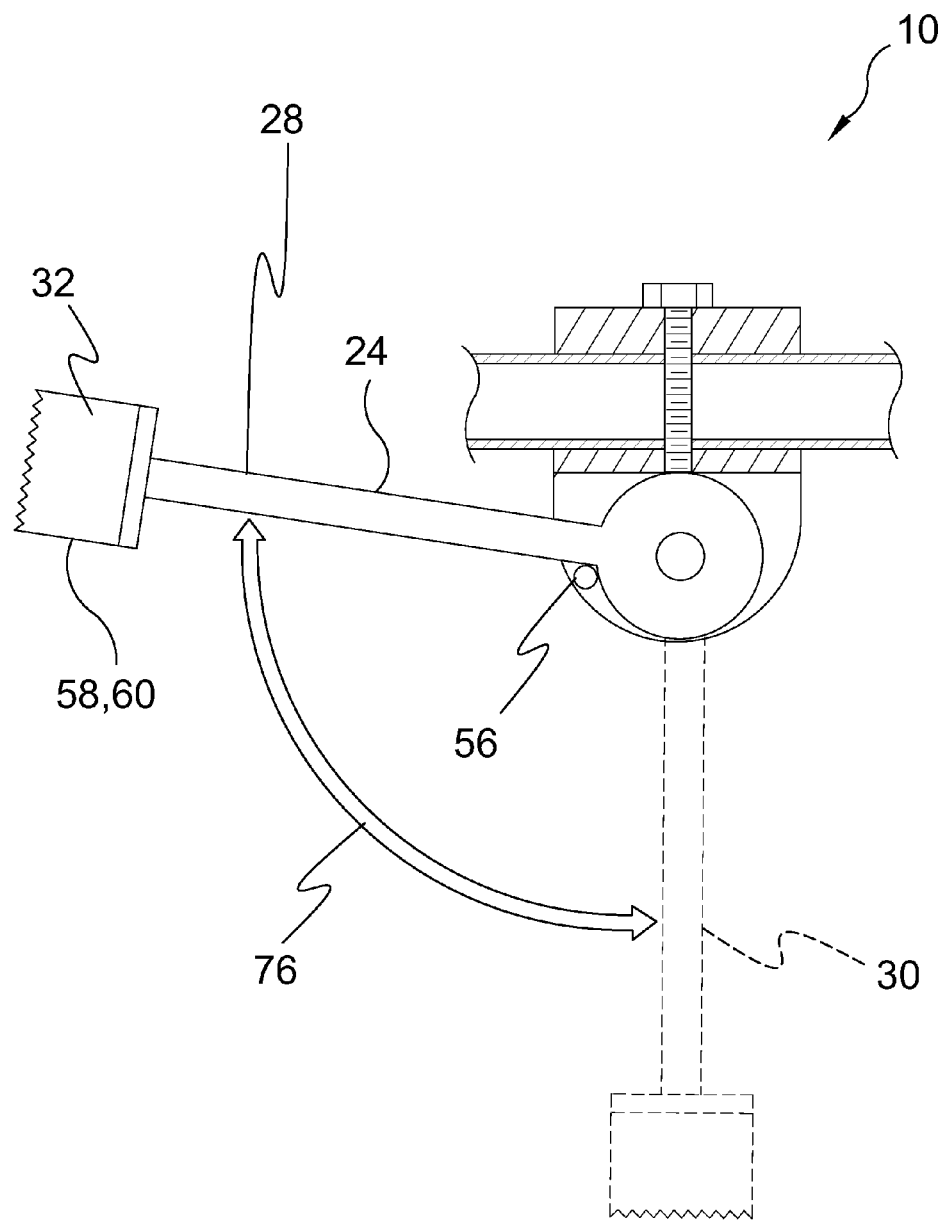
Figure 7:
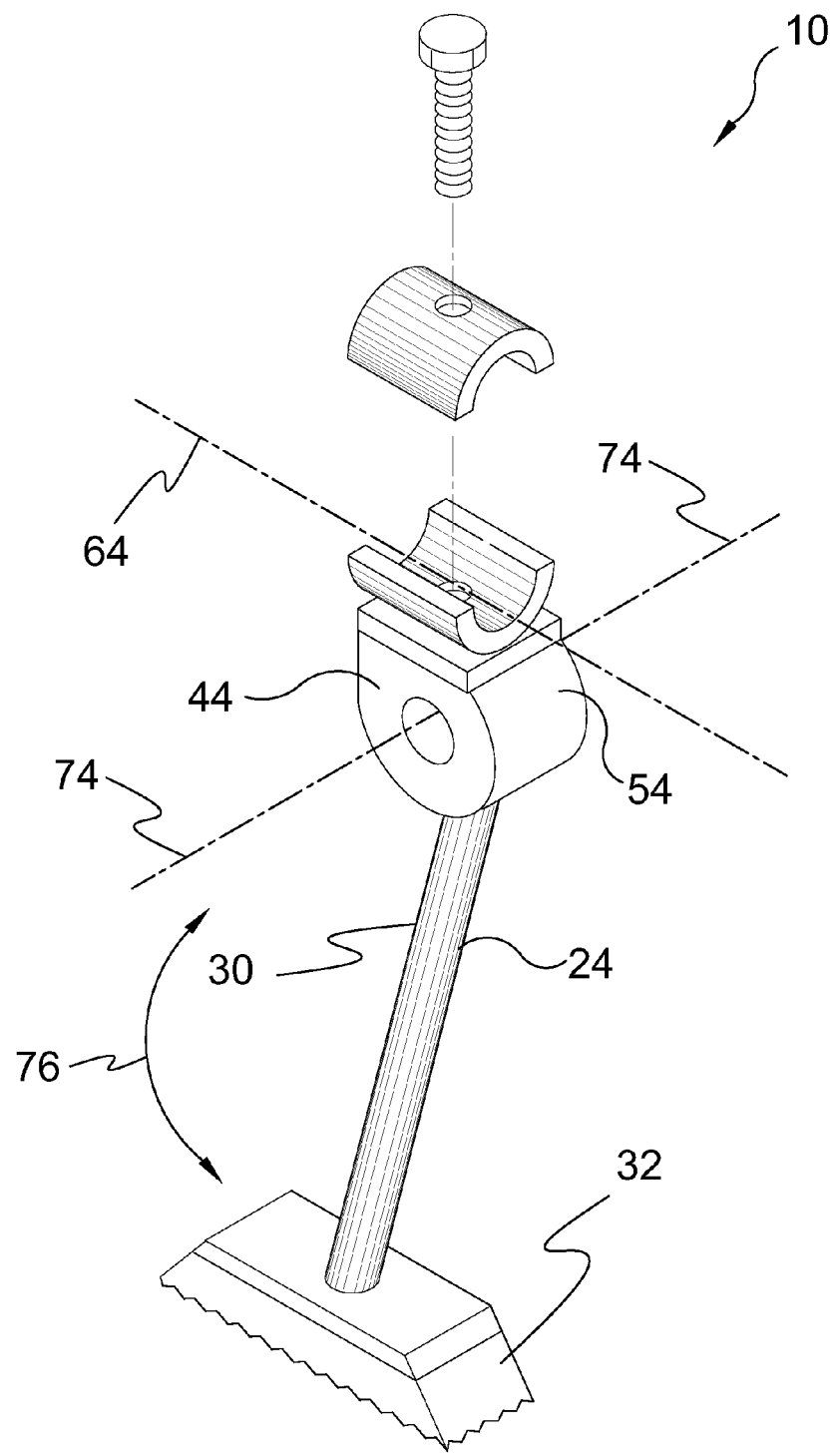
Figure 8:
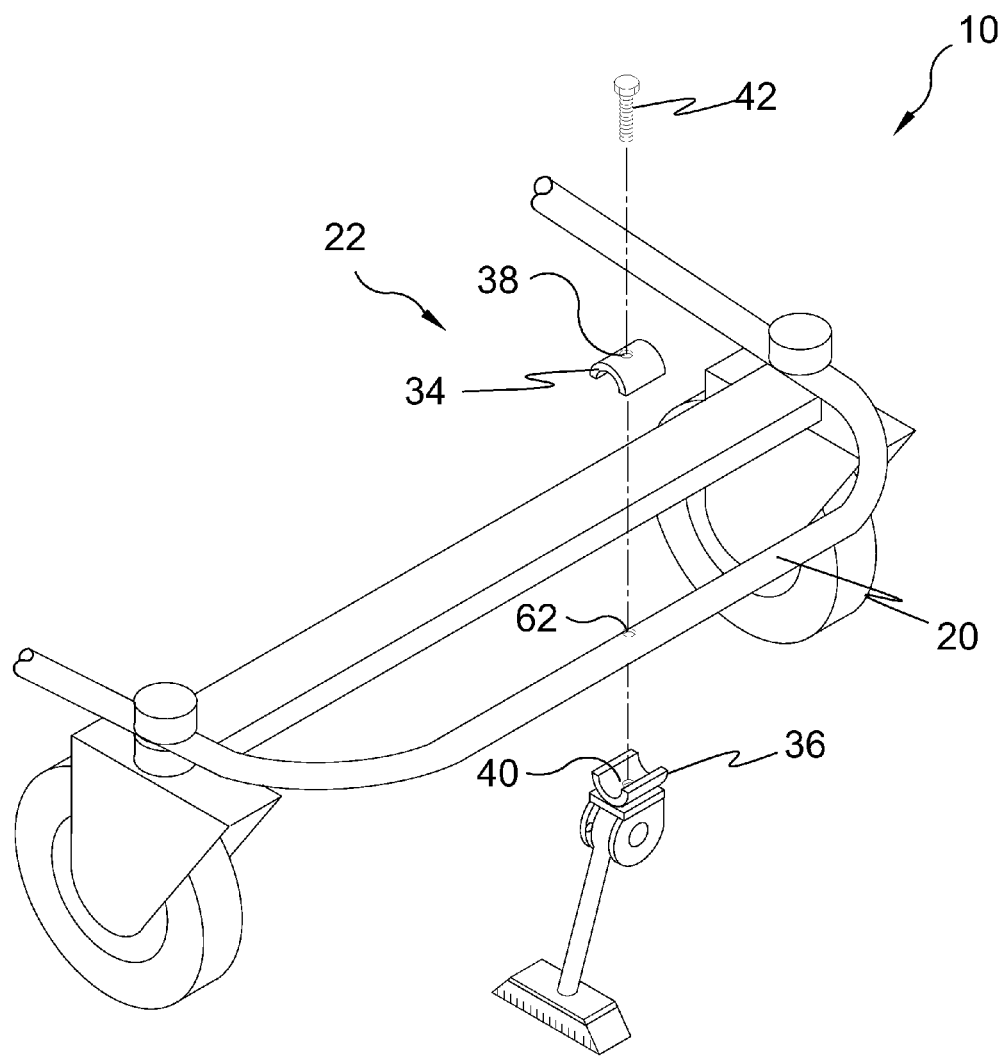
Figure 9:
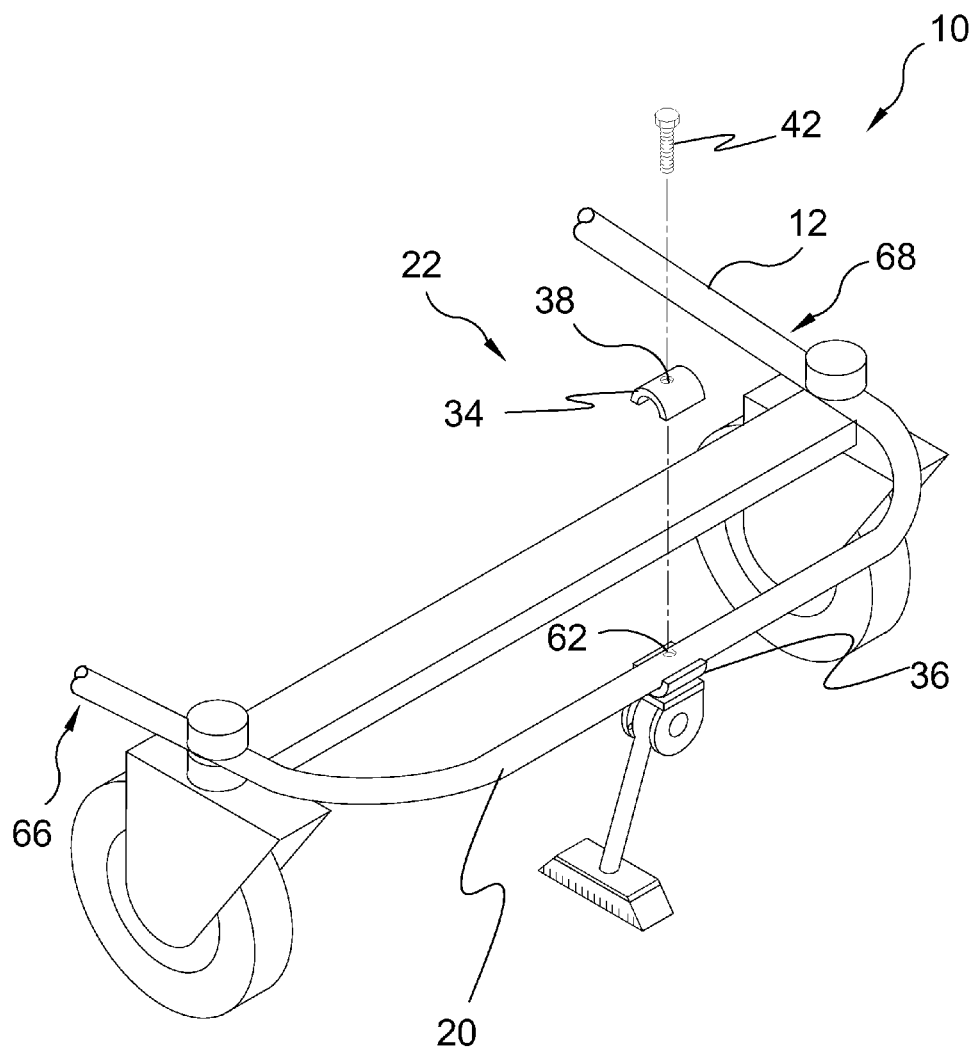
Figure 10:
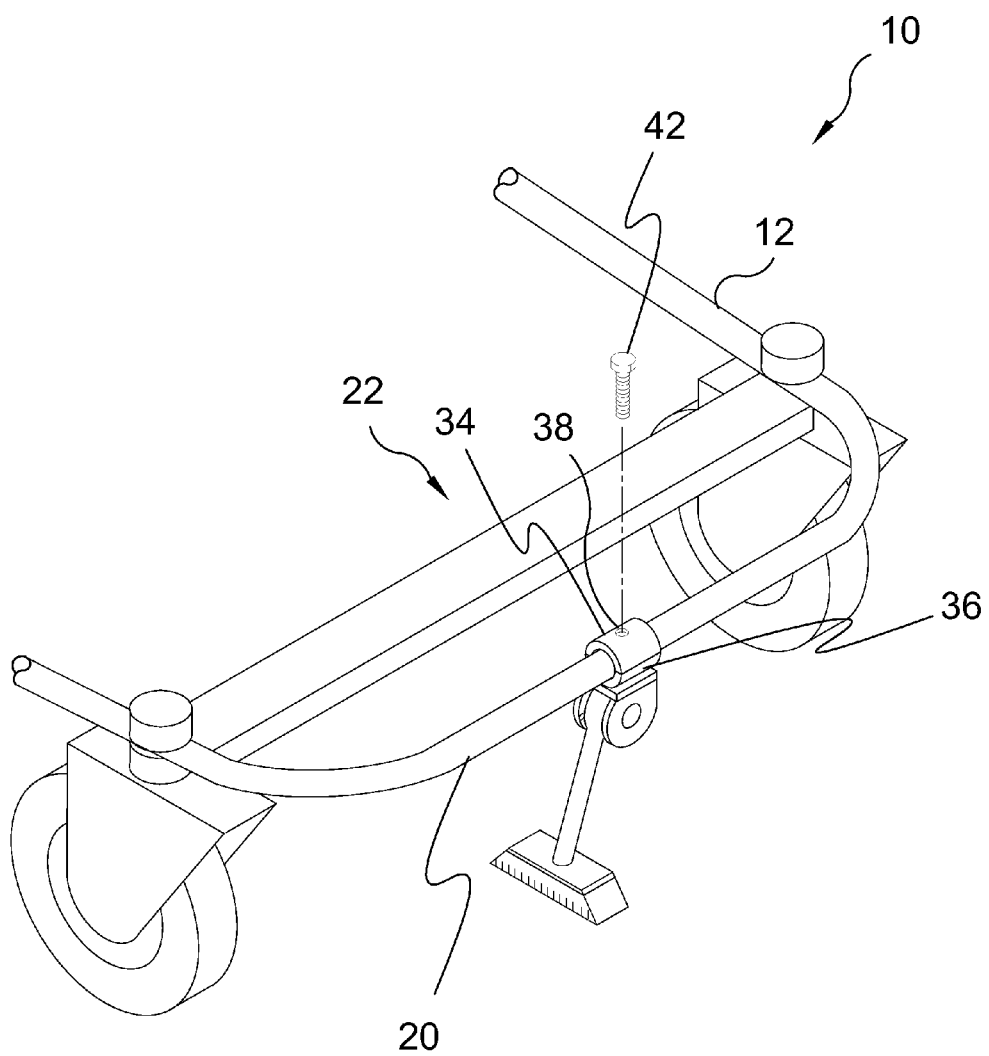
Figure 11:
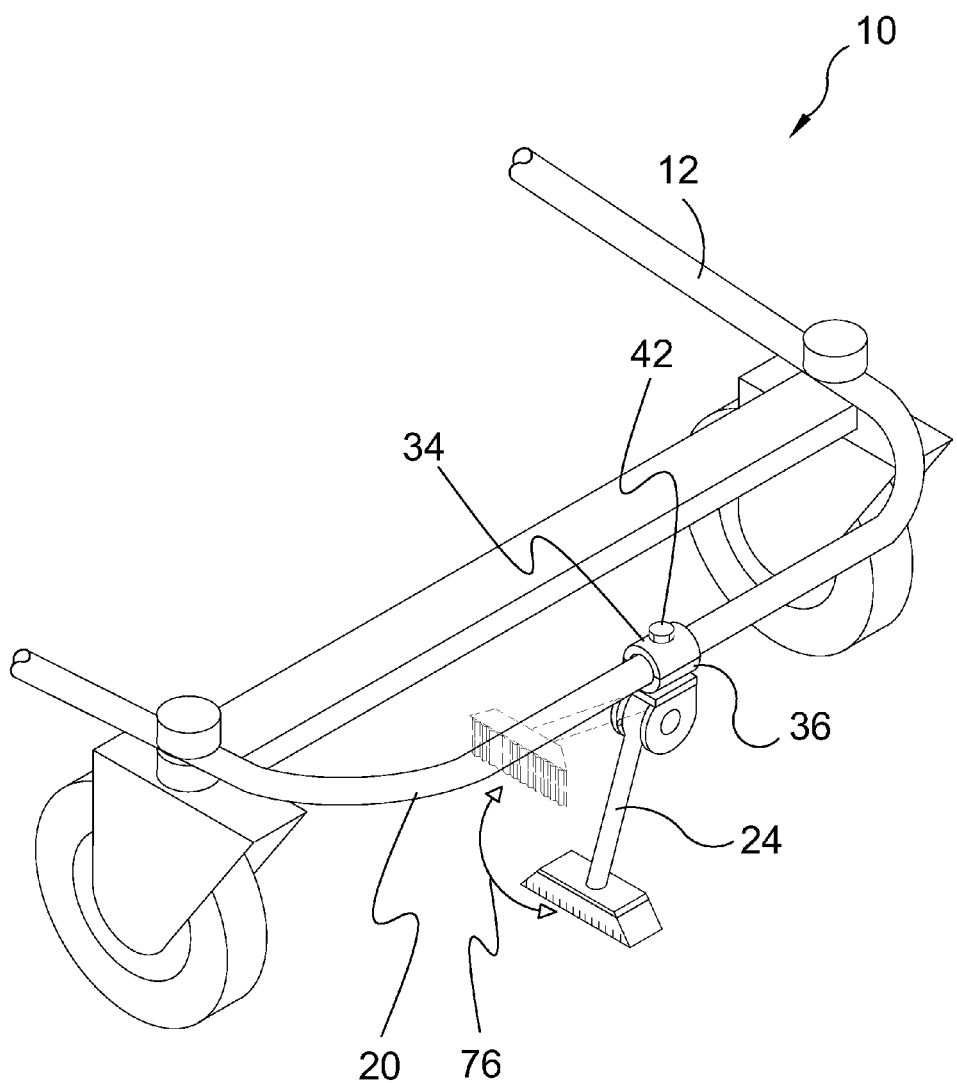
Figure 12:
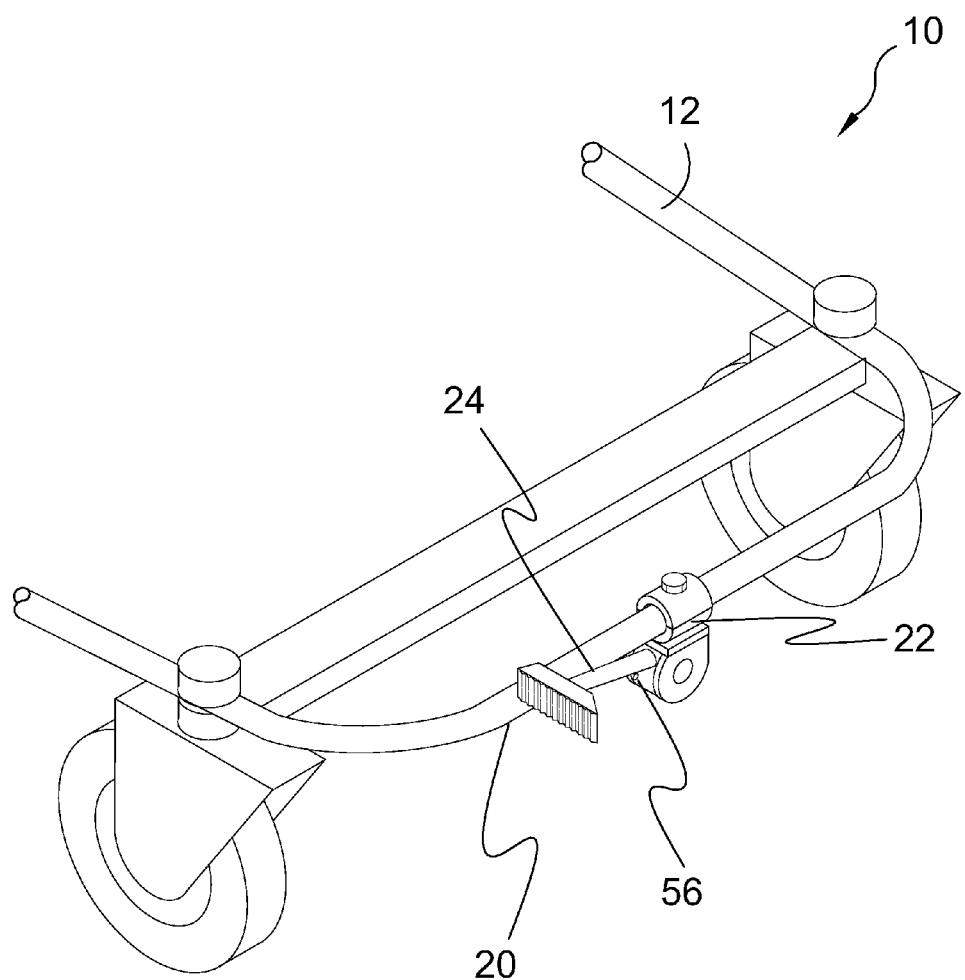

In order that the invention may be more fully understood, it will now be described, by way of example, with reference to the accompanying drawing in which:

FIG. 1 is an illustrative view of prior art.
FIG. 2 is an illustrative view of the present invention in use.
FIG. 3 is a perspective view of the present invention in use.
FIG. 4 is an exploded perspective view of the present invention.
FIG. 5 is a sectional view of the present invention.
FIG. 6 is a sectional view of the present invention.
FIG. 7 is a rear view of the present invention. Shown is a rear view the present invention.
FIG. 8 is an illustrative parts breakdown of the present invention.
FIG. 9 is a partially exploded view of the present invention.
FIG. 10 is a partially exploded view of the present invention.
FIG. 11 is an assembled view of the present invention with the brake in a down position.
FIG. 12 is an assembled view of the present invention with the cart brake in an up or disengaged position.

DESCRIPTION OF THE REFERENCED NUMERALS

Turning now descriptively to the drawings, in which similar reference characters denote similar elements throughout the several views, the figures illustrate the shopping cart braking system of the present invention. With regard to the reference numerals used, the following numbering is used throughout the various drawing figures.

10 shopping cart braking system
11 prior art
12 shopping cart
14 user
16 vehicle
18 user's foot
20 forward frame member of shopping cart
22 attachment means
24 arm
26 distal end of arm
28 up position
30 engaged position
32 brakepad
34 top clamp half
36 bottom clamp half
38 threaded aperture in top clamp half
40 threaded aperture in bottom clamp half
42 bolt
44 bracket
46 axle
48 pivotally affixed end of arm
50 eyebolt shape at pivotally affixed end of arm
52 open front side of bracket
54 closed back side of bracket
56 nub
58 elastomeric material
60 polymeric material
62 bolt aperture of 20

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of prior art 11. Wheeled shopping carts 12 tend to move in an uncontrolled manner, rolling down inclines and blowing across level surface during windy days, causing damage to property such as vehicles 16 and injury to individuals. The present invention overcomes this problem by providing a braking system designed to attach to a shopping cart 12 and which is manually operable by the cart user's 14 foot to engage and disengage the ground as a brake.

FIG. 2 is an illustrative view of the present invention in use. The present invention is a shopping cart braking system 10 comprising attachment means 22 mountable to the forward frame member 20 of a shopping cart 12 and a pivotally affixed arm 24 having a distal end 26 which, when pivoted downward from a horizontal, up position 28 to a vertical, engaged position 30, acts as a brake to prevent the shopping cart 12 from rolling. The braking system 10 is affixed to the forward bottom frame member 20 of the shopping cart 12 with the arm 24 moveable, by the user 14 pressing the arm 24 with a foot 18, from a disengaged, horizontal (up) position 28 to a vertical, ground engaging position 30 and where a tangential, or sideways, force upon the front of the shopping cart 12 frame releases the brake. The distal end 26 of the arm 24 has an elastomeric or polymeric brakepad 32 affixed thereto serving as a frictional element for the shopping cart braking system of the invention.

FIG. 3 is a perspective view of the present invention in use. The present invention is a shopping cart braking system 10 comprising attachment means 22 mountable to the forward frame member 20 of a shopping cart 12 and a pivotally affixed arm 24 having a distal end 26 which, when pivoted downward from a horizontal, up position to a vertical, engaged position, acts as a brake to prevent the shopping cart 12 from rolling. The braking system 10 is affixed to the forward bottom frame member 20 of the shopping cart 12 with the arm 24 moveable, by the user pressing the arm 24 with a foot, from a disengaged, horizontal (up) position to a vertical, ground engaging position and where a tangential, or sideways, force upon the front of the shopping cart 12 frame releases the brake.

FIG. 4 is an exploded perspective view of the present invention. Shown is an illustrative parts breakdown of the shopping cart braking system 10 of the present invention. The present invention is a shopping cart braking system 10 comprising attachment means 22 mountable to the forward frame member of a shopping cart and a pivotally affixed arm 24 having a distal end 26 which, when pivoted downward from a horizontal, up position to a vertical, engaged position, acts as a brake to prevent the shopping cart from rolling. The distal end 26 of the arm 24 has an elastomeric or polymeric brakepad 32 affixed thereto serving as a frictional element for the shopping cart braking system 10 of the invention. The attachment means 22 is shown as a clamp having a top clamp half 34 and a bottom clamp half 36 adapted to matingly engage a shopping cart frame member. An aperture 38 in the top clamp half 34 and a similarly sized threaded aperture 40 in the bottom clamp half 36 are sized to matingly engage with a bolt 42. The bottom clamp half 36 has a bracket 44 attached thereto with an axle 46 positioned within. A pivotally affixed end 48 of the arm 24 is pivotally affixed to the axle 46. Shown is the pivotally affixed end 48 comprising an eyebolt shape 50 which rotates about the axle 46. The front side 52 of the bracket 44 is open to allow the arm 24 to pivot to its extended position and the back side 54 of the bracket 44 is closed to act as an arm stop for when the arm 24 is in the extended position. When the arm 24 is returned to its horizontal (up) position a nub 56 on the bracket 44 acts as a kick lock to frictionally retain the arm 24 in a horizontal position to prevent casual displacement of the arm 24 during shopping cart use.

FIG. 5 is a sectional view of the present invention. Shown is a the shopping cart braking system 10 having an arm 24 having a pivotally affixed end 48 that rotates selectively around an axle 46 in the bracket 44 between a substantially vertical locked position and a substantially horizontal (up) position. The arm 24 is secured to the frame 20 of a shopping cart with an attachment means 22 comprising a top clamp half 34 and bottom clamp half 36 joined together with a bolt 42. The distal end 26 of the arm 24 has a brakepad 32 fabricated of an elastomeric 58 or polymeric 60 material. The nub 56 on the bracket 44 acts as a kick lock to frictionally retain the arm 24 in a horizontal position to prevent casual displacement of the arm 24 during shopping cart use.

FIG. 6 is a sectional view of the present invention. Shown is the shopping cart brake system 10 with the arm 24 pivoted into the up position 28 and retained by the frictional engagement with the kick lock nub 56. The brakepad 32 has an elastomeric 58 or polymeric 60 footing serving as a frictional element for the shopping cart brake when in the engaged position 30.

FIG. 7 is a rear view of the present invention. Shown is a rear view the shopping cart braking system 10 with the arm 24 in the down, engaged position 30. Also shown is the closed back side 54 of the bracket 44 that restricts further rotation of the arm 24 once the brakepad 32 is engaged.

FIG. 8 is an illustrative parts breakdown of the present invention. Shown is the shopping cart braking system 10 having component parts disassembled and ready for the attachment means 22 to be affixed to the forward bottom forward frame member 20 of a shopping cart 12. The bolt 42 is inserted through top clamp half 34 aperture 38 and the forward frame member 20 aperture 62 and threaded into the bottom clamp half 36 threaded aperture 40. Once mounted to the shopping cart 12, the brake base is moveable through foot pressure from a disengaged position to a ground engaging position whereby tangential force upon the shopping cart brake releases the ground engaging position.

FIG. 9 is a partially exploded view of the present invention. Shown is the shopping cart braking system 10 having the attachment means 22 partially affixed to the forward bottom forward frame member 20 of a shopping cart 12. The bolt 42 is inserted through top clamp half 34 aperture 38 and the forward frame member 20 aperture 62 and threaded into the bottom clamp half 36 threaded aperture.

FIG. 10 is a partially exploded view of the present invention. Shown is the shopping cart braking system 10 having the attachment means 22 partially affixed to the forward bottom forward frame member 20 of a shopping cart 12. The bolt 42 is inserted through top clamp half 34 aperture 38 and the forward frame member 20 aperture and threaded into the bottom clamp half 36 threaded aperture.

FIG. 11 is an assembled view of the present invention with the arm 24 in a down position. Shown is the shopping cart braking system 10 with the bolt 42 securing the top clamp half 34 and the bottom clamp half 36 to the forward frame member 20 of the shopping cart 12.

FIG. 12 is an assembled view of the present invention with the arm 24 in an up or disengaged position and retained therein by the kick lock nub 56. The attachment means 22 is secured to the forward frame member 20 of the shopping cart 12 and ready for deployment when needed.

What is claimed is new and desired to be protected by Letters Patent is set forth in the appended claims:

1. A shopping cart braking system comprising:
   a) an attachment comprising a clamp mounted on a forward frame member of a shopping cart, said frame member comprising a crossbar located at a leading edge of said shopping cart, said clamp affixed to a point on said crossbar located between ends of said crossbar;
   b) said clamp comprising a top clamp half, a bottom clamp half, said top and bottom clamp halves curving around said crossbar, a threaded aperture in a center of said top clamp half, a threaded aperture in a center of said bottom clamp half, and a threaded bolt extending through said top clamp half, said crossbar, and said bottom clamp half;
   c) a bracket comprising a pair of generally circular, spaced flat side walls with a closed portion affixed to a bottom of said clamp;
   d) an axle within said bracket extending between said side walls;
   e) an arm pivotally affixed to said axle, said arm having a pivotally affixed eyebolt shaped end pivotally affixed to said axle and a distal end pivotable about said axle between a generally horizontal position parallel to said crossbar and a generally vertical position wherein said arm is substantially at a right angle to said crossbar; and
   f) a resilient brakepad affixed to said distal end of said arm.

2. A shopping cart braking system according to claim 1, wherein said resilient brakepad comprises an elastomeric material.

3. A shopping cart braking system according to claim 1, wherein said resilient brakepad comprises a polymeric material.

4. A shopping cart braking system according to claim 1, wherein said affixed end of said arm comprises an eyebolt shape which rotates about said axle.

5. A shopping cart braking system according to claim 1, wherein said bracket further comprises:
   a) an open front side between said side walls adapted to allow said distal end of said arm to pivot to said generally horizontal position; and
   b) a closed back side between said side walls adapted to limit pivoting of said distal end of said arm stop when said arm is in said generally vertical position.

6. A shopping cart braking system according to claim 5, further comprising a nub in said front open side on one of said side walls of said bracket positioned to frictionally retain said arm in said generally horizontal position.

7. A method of immobilizing a shopping cart comprising the steps:
   a) providing a shopping cart braking system having an attachment mountable to a forward crossbar of a shopping cart; a bracket comprising a pair of spaced, flat side walls with a closed portion affixed to a bottom side of said attachment; an axle within said bracket extending between said side walls; an arm pivotally affixed to said axle, said arm having a pivotally affixed end pivotally affixed to said axle between said side walls and a distal end pivotable about said axle between a generally horizontal position parallel to said cross bar and a generally vertical position; and a resilient brakepad affixed to said distal end of said arm;
   b) mounting said attachment to an intermediate location between ends of said cross bar of said shopping cart; and
   and c) pivoting said arm from said generally horizontal position parallel to said crossbar to said generally vertical position such that said resilient brakepad acts as a brake preventing movement of said shopping cart,
   wherein said attachment comprises: a) a top clamp half: b) a bottom clamp half adapted to matingly engage said too clamp half around said forward crossbar: c) a threaded aperture in said top clamp half: d) a threaded aperture in said bottom clamp half: and e) a bolt matingly engaged with said threaded aperture in said top clamp half and said threaded aperture in said bottom clamp half, said bolt passing through said forward crossbar, said bracket being attached to said bottom clamp half.

8. A method of immobilizing a shopping cart according to claim 7, wherein said resilient brakepad comprises an elastomeric material.

9. A method of immobilizing a shopping cart according to claim 7, wherein said resilient brakepad comprises a polymeric material.

10. A method of immobilizing a shopping cart according to claim 7, wherein said affixed end of said arm comprises an eyebolt shape which rotates about said axle.

11. A method of immobilizing a shopping cart according to claim 10, wherein said
    closed back side of said bracket is adapted to limit pivoting of said distal end of said arm stop when said arm is in said generally vertical position.

12. A method of immobilizing a shopping cart according to claim 11, further comprising a nub on a side wall of said bracket positioned to frictionally retain said arm in said generally horizontal position.

* * * * *